A. SIMIS, OF BROOKLYN, E. D., NEW YORK.

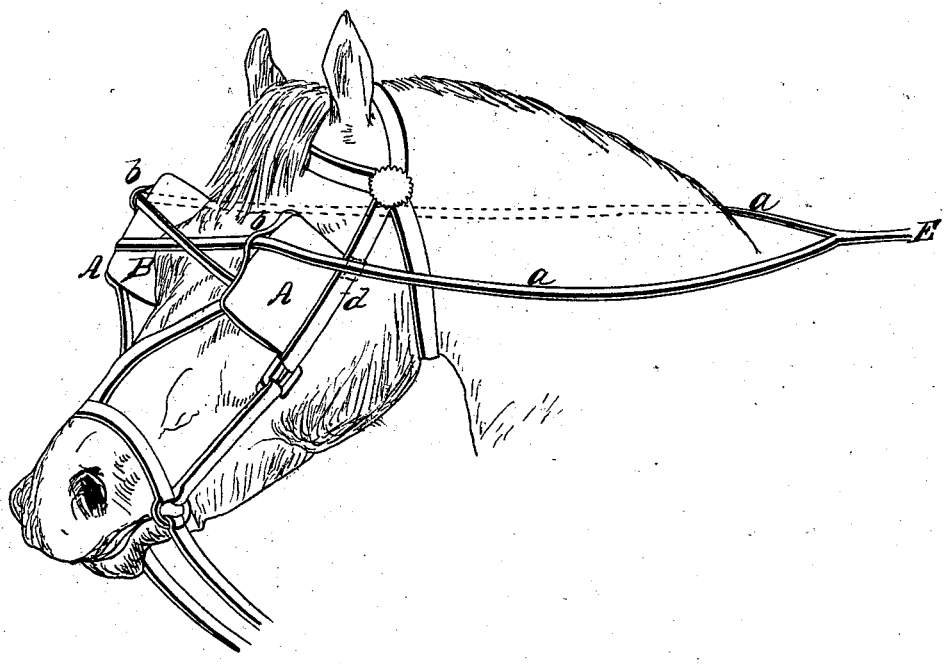

Letters Patent No. 85,406, dated December 29, 1868.

IMPROVED OPERATING BRIDLE-BLIND.

The Schedule referred to in these Letters Patent and making part of the same.

*To all whom it may concern:*

Be it known that I, A. SIMIS, of Brooklyn, E. D., Kings county, New York, have invented a new and useful Improvement in Operating Bridle-Blinds; and I do hereby declare that the following is a full, clear, and exact description thereof, which will enable others skilled in the art to make and use the same, reference being had to the accompanying drawings, forming part of this specification.

The object of this invention consists in so connecting the blinds or blinkers of a bridle, by means of a forked rein, that by pulling on the said rein the blinds or blinkers may be instantly brought over the horse's eyes, and entirely shut off his sight, as occasion may require, in the event of the horse running away, or otherwise becoming unmanageable.

The construction and operation will be understood from the following description, reference being had to the accompanying drawing, which represents a perspective view of my operating bridle-blind, showing the same as attached to the animal.

The letters A, in the accompanying drawing, represent the blinds or blinkers attached to the headstall of a bridle, in the usual manner; and on the front edges of the blinds or blinkers the forked lines $a\,a$ are fixed, these lines passing by each other and across the forehead of the horse, and leading through the straps or rings $b$ and $d$, so that, as the lines $a\,a$ are drawn, each blind or blinker, A, will be brought closely up to and against the horse's eyes, thereby entirely shutting off his sight, whereupon the animal will at once be under the control of the driver.

The interior surfaces of the blinds or blinkers are padded on their outer edges, so as to form a central cavity, B, in order to prevent the said blinds or blinkers from pressing upon the eye-balls of the animal, and also for the purpose of allowing the pad to adjust itself to the unevenness of the animal's head, so as to shut off his vision entirely.

The lines $a\,a$ are attached to a single line, E, which leads back to a suitable place in the vehicle, where it may be seized in a moment by the driver, should the animal make an attempt to run away, &c.

Having described my invention,

I claim as new, and desire to secure by Letters Patent—

1. The rein-line or cord E, with bifurcating parts $a\,a$, substantially as shown and described, or the equivalent thereof, for the purpose of pressing the blinds or blinkers, A, of a bridle upon and against the eyes of a horse, all as and for the purpose set forth.

2. Padding the blinds of a bridle, to form a cavity, B, in the same, substantially as shown and described, and for the purpose specified.

3. Employing the blinds of a bridle to shut off the sight of an animal, substantially as shown, and for the purpose specified.

The above specification of my invention signed by me, this 22d day of January, 1868.

A. SIMIS.

Witnesses:
CHARLES H. NASH,
WM. F. McNAMARA.